(12) United States Patent
Levy et al.

(10) Patent No.: US 6,912,896 B2
(45) Date of Patent: Jul. 5, 2005

(54) METHODS FOR ESTIMATION OF TIRE WEAR

(75) Inventors: Georges Levy, Clermont-Ferrand (FR); Nicolas Fangeat, Chamalieres (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 10/611,535

(22) Filed: Jul. 1, 2003

(65) Prior Publication Data

US 2004/0049303 A1 Mar. 11, 2004

(30) Foreign Application Priority Data

Jul. 4, 2002 (FR) ............................................ 02 08413

(51) Int. Cl.$^7$ ............................................. B60C 11/24
(52) U.S. Cl. ........................................................ 73/146
(58) Field of Search .......................... 73/146, 9, 146.2, 73/146.3, 146.4, 146.5, 146.8; 303/148, 149, 150; 701/74

(56) References Cited

U.S. PATENT DOCUMENTS

| | | | |
|---|---|---|---|
| 4,794,538 A | * 12/1988 | Cao et al. ...................... | 701/74 |
| 5,343,918 A | * 9/1994 | Fontaine ................... | 152/209.5 |
| 5,513,907 A | * 5/1996 | Kiencke et al. ............. | 303/150 |
| 6,015,192 A | 1/2000 | Fukumura ................... | 303/140 |
| 6,550,320 B1 | * 4/2003 | Giustino ....................... | 73/146 |
| 2004/0225423 A1 | * 11/2004 | Carlson et al. ............... | 701/36 |

FOREIGN PATENT DOCUMENTS

| | | |
|---|---|---|
| DE | 10156823 | 6/2002 |
| FR | 2816402 | 10/2002 |

OTHER PUBLICATIONS

Grosch, K. A. Kautschuk und Gummi Kunststoffe Jun. 1996 v49 n 6 p432–441.*

Yamazaki Shun'ichi The Determination of Tire Parameter for Real Time Estimation of Tire and Road Friction 1997 Jpn. Automob. Res. Inst. Inc p165–168.*

Sakai Tomotsugu, Investigation of Lambourne Wear Test Conditions to Evaluate Tire Wear Life, Toyota Motor Corp., proceedings of the International Sessions JSME Spring annual meetig, 1996 vol. 73 p. 33–34.*

* cited by examiner

*Primary Examiner*—Michael Cygan
*Assistant Examiner*—Andre Allen
(74) *Attorney, Agent, or Firm*—Fitzpatrick, Cella, Harper & Scinto

(57) ABSTRACT

A method for controlling the functioning of a tire includes the steps of determining estimations or measurements of the slip $G_i$ and the coefficient of friction $\mu_i$ prevailing at such slip for at least one pair "i" of values ($G_i$, $\mu_i$); determining the corresponding values of the slope $\alpha_i$ of the straight line passing through the origin and through each pair ($G_i$, $\mu_i$); calculating a coefficient B by direct calculation or by a regression from a sufficient number of pairs of ($\alpha_i$, $G_i$) so as to estimate the value of slope $\alpha_0$ at the origin; and using $\alpha_0$ in an indicator of the longitudinal stiffness of the tread pattern.

10 Claims, 3 Drawing Sheets

Measurements μ, G
↓
Calculation of secant
↓
Calculation of regression
↓
Calculation of longitudinal stiffness
↓
Estimation of wearing

METHODS FOR ESTIMATION OF TIRE WEAR

BACKGROUND OF THE INVENTION

1. The Field of the Invention

The invention relates to tires, and more particularly to methods for the estimation of tire wear.

2. The Related Art

It would be interesting to be able to estimate the wear of tires mounted on a vehicle, if not to have precise measurements, in order to give a warning to the driver and/or in order to adapt automatically some parameters of systems equipping certain vehicles. For instance, it would be advantageous to adjust automatically some parameters of anti-lock braking systems according to tire wear, in order to improve system performance.

SUMMARY OF THE INVENTION

The object of the invention is, to propose a tire wear estimation process that is easy to implement, namely on vehicles already equipped with anti-lock braking systems (well known under the name "ABS"), which are more and more standard equipment.

The invention proposes a method for controlling the functioning of a tire, comprising the following steps:

- determining estimations or measurements of the slip $G_i$ and the coefficient of friction $\mu_i$ prevailing at such slip, for at least one pair "i" of values $(G_i, \mu_i)$ in a coordinate system having an axis $G$, an axis $\mu$ and an origin;
- determining the corresponding values of the slope $\alpha_i$ of the straight line passing through the origin and through each pair of values $(G_i, \mu_i)$;
- calculating a coefficient B by direct calculation or by a regression from a sufficient number of pairs of $(\alpha_i, G_i)$ so as to estimate the value of slope $\alpha_0$ at the origin; and
- using $\alpha_0$ in an indicator of the longitudinal stiffness of the tread pattern.

The coefficient of friction $\mu$ can be obtained, in the context of the present invention, by any appropriate means, for instance from measurements made in the tire or its environment. When the invention is used on vehicles having ABS braking systems, it is possible, although not mandatory, to rely on an estimation as made in such systems, as briefly recalled hereinafter. When braking in a straight line on a homogeneous ground, the brake force $F_X$ of the tire on the ground is determined from the brake pressure and the construction parameters of the wheel and of its brake. With the knowledge of all the forces $F_X$ applied by all of the tires, it is possible to calculate the deceleration of the vehicle, and therefore, taking account of the vehicle characteristics, the load transfer, and therefore the load variations on each of the wheels. From this, it is possible to deduce an approximation of the vertical load $F_Z$ applied to each tire. An estimation of the coefficient of friction $$\mu = \frac{F_X}{F_Z}$$

is thus obtained. If the corresponding lateral force $F_y$ is known, by estimation or measurement, a more precise estimation of the coefficient of friction is given by the formula $$\mu = \frac{\sqrt{F_X^2 + F_Y^2}}{F_Z}.$$

In the context of the present invention, these two estimations will be considered as equivalent. Similarly, and this is obvious to a person skilled in the art, in the context of the present invention, everything that has been stated about braking is valid in the case of acceleration. In other words, a braking force is, as regards the considerations relating to grip, equivalent to a driving force, even if, of course, the actuators for modifying these are not the same.

With regard to the slip rate G of the tire, it should be borne in mind that G=0% when there is no slip between the speed of the tire and the speed of the vehicle, that is to say, if the tire rolls freely, and that G=100% if the tire is rotationally locked while the speed of the vehicle is not zero.

BRIEF DESCRIPTION OF THE DRAWINGS

The invention will be explained in more detail below with reference to the attached figures, in which.

DESCRIPTION OF EXEMPLARY EMBODIMENTS

Figure 3:
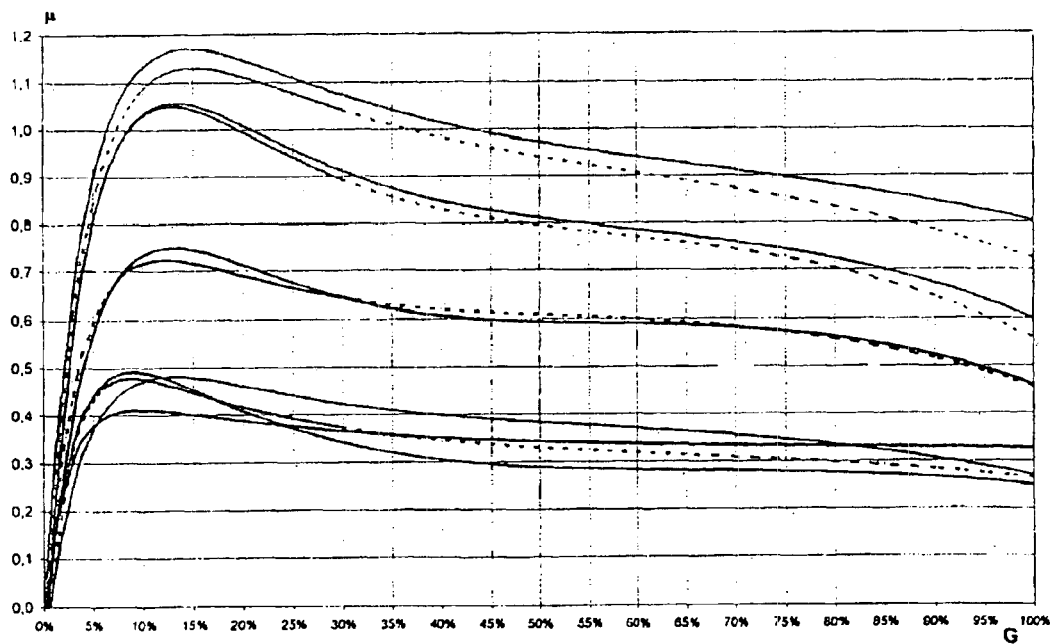
FIG. 3 shows several plots of the variation of the coefficient of friction $\mu$ with respect to the slip G for the same tire under various test conditions.

The present invention is based on the following observations. FIG. 3 shows various curves of the coefficient of friction $\mu$ as a function of the slip G for the one identical new MICHELIN XH1 195/65-15 tire, tested at one load and speed condition, on various grounds, at an inflation pressure of 2 bars. Typically, depending on the environment (nature of the ground (asphalt, concrete), dry or wet (water level), temperature and level of wear of the tire), the value of $\mu$ as a function of the slip G may vary enormously ($\mu_{max}$ is about 0.15 on ice and about 1.2 on a dry ground).

One makes use of measurements acquired at each braking (or at each acceleration), while the coefficient of friction $\mu$ is going to a maximum value, taking benefit of all relevant information available.

Figure 1:
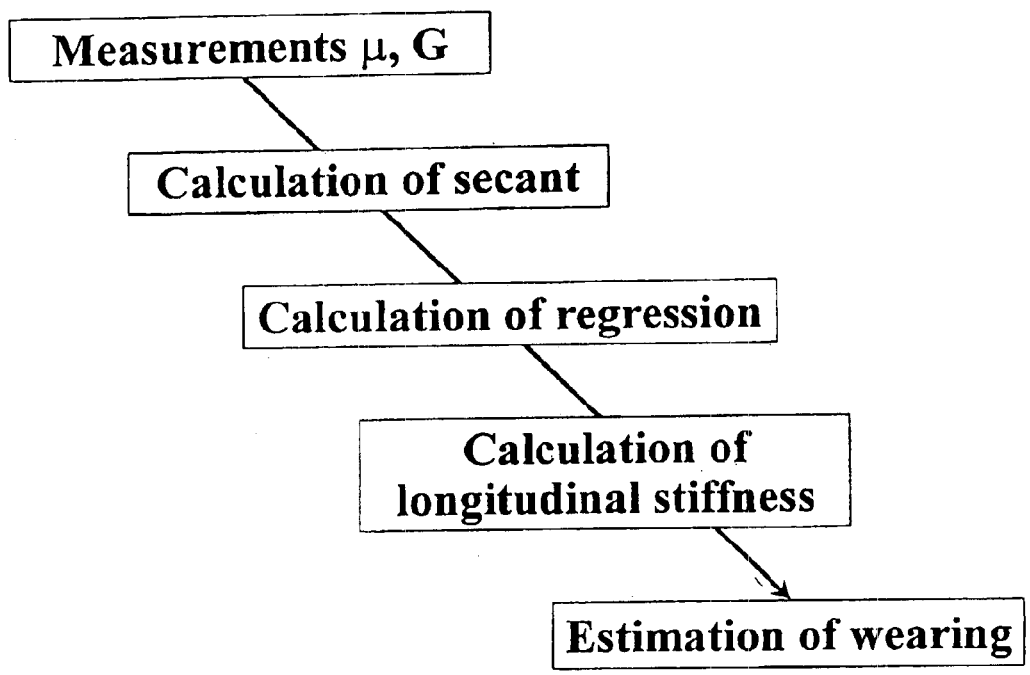
FIG. 1 is a block diagram showing the automatic control procedure according to the invention.
Figure 2:
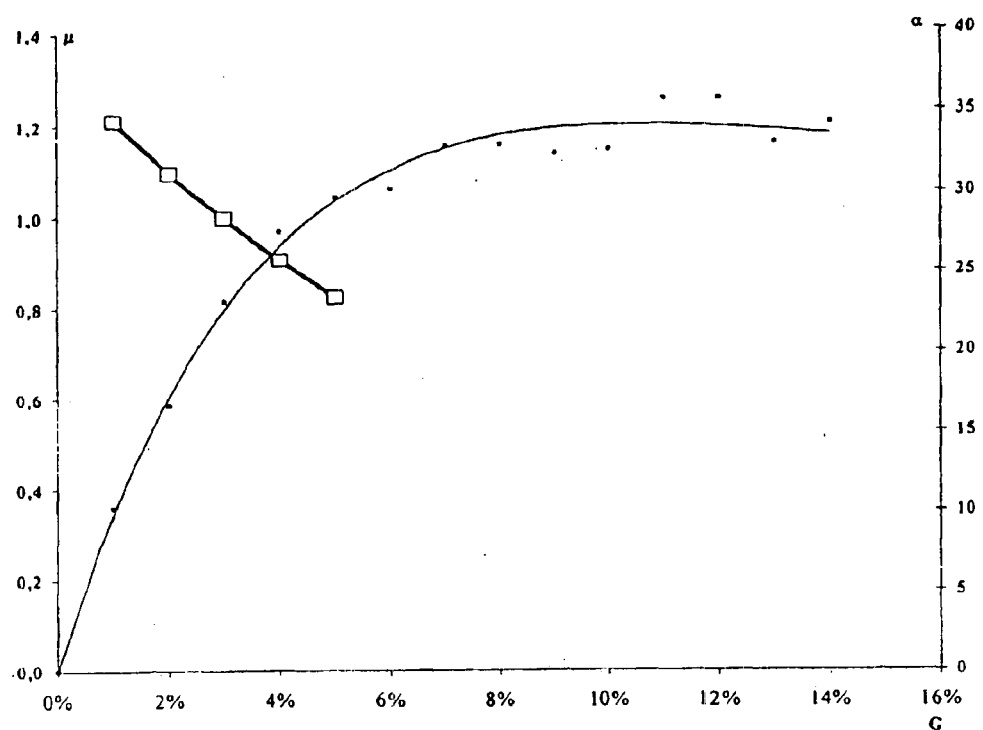
FIG. 2 is a curve of the variation of the coefficient of friction $\mu$ with respect to the slip G and the variation at the same slip of the secant passing through the origin and the point of the previous curve at the same slip.

FIG. 1 illustrates the proposed algorithm, the main steps of which are as follows:

1. Acquisition of the points $(G_i, \mu_i)$, by measurement or estimation, according to the practical possibilities. It is advisable to acquire at least 2 pairs "i" $(G_i, \mu_i)$. It is ensured that $G_i$ is significantly non-zero, and a minimum threshold may be imposed here to eliminate values which are too low to be relevant.

Figure 4:
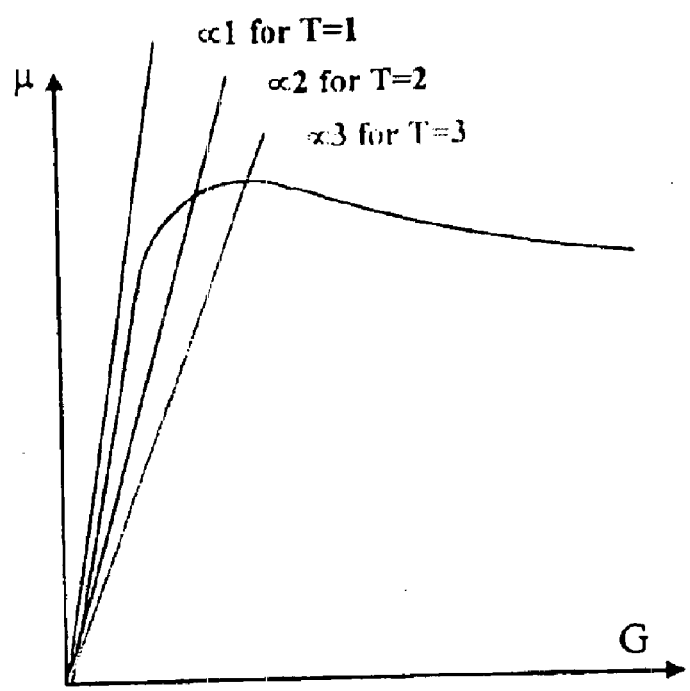
FIG. 4 shows a typical schematic curve of the variation of the coefficient of friction $\mu$ with respect to the slip G and shows the course of the secants passing through the origin and the curve for three particular slips.

2. Calculation of the characteristic slope $\alpha$ of the secant passing through the origin and the curve $\mu(G)$: with the values $(G_i, \mu_i)$ previously acquired, the secant is evaluated, thanks to a direct calculation $\alpha_i = \mu_i/G_i$ (see FIG. 4) or by carrying out a suitable regression. For example, a linear regression as follows:

$$\sum_{GG} = \sum G_j^2, \sum_{G\mu} = \sum G_j \cdot \mu_j, \alpha_i = \frac{\sum_{G\mu}}{\sum_{GG}} \qquad \text{Eq. (1)}$$

considering all the subscript points less than or equal to i so as to eliminate the noise. This is because the linear regression is by nature much less sensitive to the measurement noise on each individual point, the disturbances tending to cancel each other out if a sufficient number of points are considered (cf. basic statistical properties). This approach is particularly advantageous since, unlike in the past, it is not the individual values which are of interest (imprecise since noisy) but tendencies emerging from a plurality of values. The pairs $(G_i, \mu_i)$ are therefore obtained.

Figure 5:
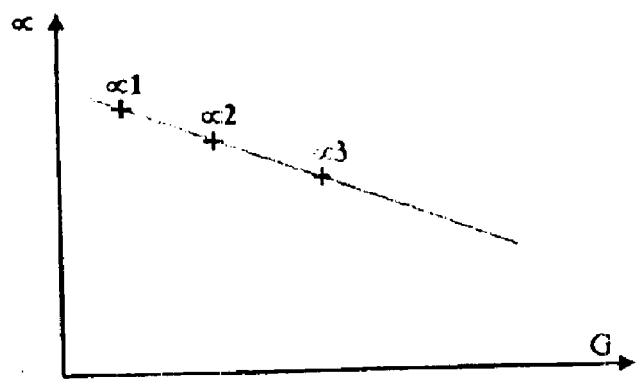
FIG. 5 shows a typical schematic curve of the linear variation as a function of the slip G of the slope $\alpha$ of the secant passing through the origin and the point of the curve of the variation of the coefficient of friction at the same slip.

3. Calculation of a coefficient B by regression with $(\alpha_i, G_i)$: a regression is calculated from a sufficient number "n" of points, the number of points allowing to be satisfactorily non-noise affected Case of a linear regression applied to n measured or estimated points: (see FIG. 5):

$$B^{Lin} = \frac{\sum \alpha \cdot \sum G^2 - \sum G \cdot \alpha \cdot \sum G}{n \cdot \sum G^2 - (\sum G)^2} \qquad \text{Eq. (2)}$$

Case of an exponential regression applied to n measured or estimated points:

$$B^{Exp} = \frac{\sum Ln(\alpha) \cdot \sum G^2 - \sum G \cdot Ln(\alpha) \cdot \sum G}{n \cdot \sum G^2 - (\sum G)^2} \qquad \text{Eq. (3)}$$

By the most suitable regression, the coefficient B is obtained. Other regressions than the ones indicated might be used, the various regressions to be considered are well known to a person skilled in the art, who will be able to obtain the coefficient or the coefficients of the selected regression.

4. Calculation of a longitudinal stiffness: the coefficient B obtained hereabove is representative of the longitudinal stiffness of the tire;

Case of a linear regression: Stiffness=$B^{Lin}$     Eq. (4)

Case of an exponential regression: Stiffness=$e^{B^{Exp}}$     Eq. (5)

It is noted that the coefficient B is equal to the value of the angle $\alpha$ for a zero slip ($\alpha_0$). However, it is not possible to calculate it directly; it is obtained by a regression. It is proposed here either a linear regression or an exponential regression.

5. Estimation of wear. An average value of $\alpha_0$ is determined and a comparison with reference values for the tire subject to processing can be made, in order to estimate the wear rate. For instance, starting from a standard tread pattern with an initial height $H_0 = 8$ mm, having recorded a standard Stiffness "Stiffness$_0$" in new conditions, and recording a reset at each change of tires, an estimation of the remaining height H of the tread pattern is calculated for instance as a proportion of $H_0$ (more sophisticated models could be envisioned):

$$H = H_0 \cdot \frac{Stiffness}{Stiffness_0}. \qquad \text{Eq. (6)}$$

Of course, the estimation of H or $\alpha_0$ could be more reliable by calculating an average value obtained on a predetermined number of brakings (or accelerations since it is equivalent as already stated), or on a predetermined distance.

The invention provides a good estimation of the longitudinal stiffness of a tire. The longitudinal stiffness has two components: a structural component coming from the carcass of the tire and a "pattern" component coming from the tread pattern of the tire. The structural component remains unchanged throughout the life of the tire. The pattern component, however, changes continuously during the service of the tire, according to wear. The pattern component is increased with wear, roughly proportionally. Therefore, the invention provides an estimation of tire wear.

By calculating average values of the estimation of the remaining value H over suitable sampling periods of time, the influence of the different grounds on which the tire rolls is cancelled out, and the estimation becomes reliable.

What is claimed is:

1. A method for controlling the functioning of a tire, comprising the step of:
   (a) determining estimations or measurements of the slip $G_i$ and the coefficient of friction $\mu_i$ prevailing at said slip, for at least one pair "i" of values $(G_i, \mu_i)$ in a coordinate system having an axis G, an axis $\mu$ and an origin;
   (b) determining the value of the slope $\alpha_i$ of the straight line passing through the origin and through each pair of values $(G_i, \mu_i)$;
   (c) calculating a coefficient B by direct calculation or by a regression from a sufficient number of pairs of $(\alpha_i, G_i)$ so as to estimate the value of slope $\alpha_0$ at the origin; and
   (d) using $\alpha_0$ in an indicator of the longitudinal stiffness of the tread pattern.

2. A method for controlling the functioning of a tire according to claim 1, in which the slope $\alpha_i$ is determined by direct calculation $\alpha_i = \mu_i/G_i$.

3. A method for controlling the functioning of a tire according to claim 1, in which the slope $\alpha_i$ is determined by carrying out a suitable regression.

4. A method for controlling the functioning of a tire according to claim 1, in which the following linear regression is carried out:

$$\sum_{GG} = \sum G_j^2, \sum_{G\mu} = \sum G_j \cdot \mu_j, \alpha_i = \frac{\sum_{G\mu}}{\sum_{GG}}.$$

5. A method for controlling the functioning of a tire according to claim 1, in which a coefficient B, representative of the longitudinal stiffness, is calculated by the following linear regression, applied to "n" measured or estimated points:

$$B^{Lin} = \frac{\sum \alpha \cdot \sum G^2 - \sum G \cdot \alpha \cdot \sum G}{n \cdot \sum G^2 - (\sum G)^2}.$$

6. A method for controlling the functioning of a tire according to claim 1, in which the coefficient B, representative of the longitudinal stiffness, is calculated by the following exponential regression, applied to "n" measured or estimated points:

$$B^{Exp} = \frac{\sum Ln(\alpha) \cdot \sum G^2 - \sum G \cdot Ln(\alpha) \cdot \sum G}{n \cdot \sum G^2 - (\sum G)^2}.$$

7. A method for controlling the functioning of a tire according to claim 1, in which an average value of $\alpha_0$ is determined and a comparison with reference values for the tire subject to processing is made, in order to estimate the wear rate.

8. A method for controlling the functioning of a tire according to claim 7, wherein an estimation of the remaining height H of the tread pattern is made as follows:

$$H = H_0 \cdot \frac{Stiffness}{Stiffness_0}.$$

9. A method for controlling the functioning of a tire according to claim 7 or 8, in which an average value of $\alpha_0$ is determined on the basis of a predetermined number of brakings or accelerations.

10. A method for controlling the functioning of a tire according to claim 7 or 8, in which an average value of $\alpha_0$ is determined on the basis of a predetermined distance.

* * * * *